(12) United States Patent
Aaron

(10) Patent No.: US 7,735,142 B2
(45) Date of Patent: Jun. 8, 2010

(54) ELECTRONIC VULNERABILITY AND RELIABILITY ASSESSMENT

(75) Inventor: Jeffrey A. Aaron, Atlanta, GA (US)

(73) Assignee: AT&T Intellectual Property I, L.P., Bedminster, NJ (US)

( * ) Notice: Subject to any disclaimer, the term of this patent is extended or adjusted under 35 U.S.C. 154(b) by 260 days.

(21) Appl. No.: 11/768,055

(22) Filed: Jun. 25, 2007

(65) Prior Publication Data

US 2008/0172743 A1   Jul. 17, 2008

Related U.S. Application Data

(62) Division of application No. 10/611,637, filed on Jun. 30, 2003, now Pat. No. 7,237,266.

(51) Int. Cl.
   *H04L 29/00*   (2006.01)
(52) U.S. Cl. .................. 726/25; 726/1; 726/2; 713/165; 713/166; 713/167; 707/102
(58) Field of Classification Search .................. 726/1, 726/2, 25; 713/165, 166, 167; 707/102, 707/104.1
   See application file for complete search history.

(56) References Cited

U.S. PATENT DOCUMENTS

| | | | |
|---|---|---|---|
| 4,888,771 A | 12/1989 | Benignus et al. | 714/26 |
| 4,967,337 A | 10/1990 | English et al. | 700/79 |
| 4,985,857 A | 1/1991 | Bajpai et al. | 702/184 |
| 5,117,353 A | 5/1992 | Stipanovich et al. | |
| 5,224,206 A | 6/1993 | Simoudis | |
| 5,243,689 A | 9/1993 | Yoshiura et al. | 706/12 |
| 5,267,351 A | 11/1993 | Reber et al. | 707/104.1 |
| 5,388,259 A | 2/1995 | Fleischman et al. | 707/5 |
| 5,408,412 A | 4/1995 | Hogg et al. | 701/33 |
| 5,444,823 A | 8/1995 | Nguyen | 706/54 |
| 5,491,791 A | 2/1996 | Glowny et al. | 395/183.13 |
| 5,586,252 A | 12/1996 | Barnard et al. | |
| 5,596,712 A | 1/1997 | Tsuyama et al. | |
| 5,640,403 A | 6/1997 | Ishiyama et al. | 714/737 |
| 5,668,944 A | 9/1997 | Berry | |
| 5,696,701 A | 12/1997 | Burgess et al. | 714/25 |
| 5,704,036 A | 12/1997 | Brownmiller et al. | 714/43 |
| 5,715,374 A | 2/1998 | Heckerman et al. | 706/46 |
| 5,717,835 A | 2/1998 | Hellerstein | 706/46 |
| 5,794,237 A | 8/1998 | Gore, Jr. | 707/5 |

(Continued)

OTHER PUBLICATIONS

U.S. Notice of Allowance / Allowability dated Jan. 8, 2008 in U.S. Appl. No. 10/611,634.

(Continued)

*Primary Examiner*—Kambiz Zand
*Assistant Examiner*—Tongoc Tran
(74) *Attorney, Agent, or Firm*—Hope Baldauff Hartman, LLC

(57) ABSTRACT

Systems for providing information on system vulnerabilities include a database populated with descriptive system information and a database structure configured as a hierarchical plurality of database pages configured to include element vulnerability information and links to related database pages. A rule processor module is configured to provide rules for cycling through the database structure to match keywords, such as keywords provided by user input, and descriptive system information from the database with element vulnerability information from the database structure. Other systems and methods are also provided.

5 Claims, 8 Drawing Sheets

U.S. PATENT DOCUMENTS

| | | | | |
|---|---|---|---|---|
| 5,822,743 | A | 10/1998 | Gupta et al. | 706/50 |
| 5,862,325 | A | 1/1999 | Reed et al. | 709/201 |
| 5,944,839 | A | 8/1999 | Isenberg | |
| 5,951,611 | A | 9/1999 | La Pierre | 701/29 |
| 5,968,195 | A | 10/1999 | Ishiyama | 714/727 |
| 5,977,964 | A | 11/1999 | Williams et al. | 715/721 |
| 6,006,016 | A | 12/1999 | Faigon et al. | |
| 6,026,388 | A | 2/2000 | Liddy et al. | 707/1 |
| 6,026,393 | A | 2/2000 | Gupta et al. | 707/3 |
| 6,052,809 | A | 4/2000 | Bowden | 714/738 |
| 6,073,170 | A | 6/2000 | Sumita et al. | 709/218 |
| 6,098,061 | A | 8/2000 | Gotoh et al. | 706/50 |
| 6,125,458 | A | 9/2000 | Devan et al. | 714/43 |
| 6,128,753 | A | 10/2000 | Keeble et al. | 714/25 |
| 6,131,085 | A | 10/2000 | Rossides | 705/1 |
| 6,189,114 | B1 | 2/2001 | Orr | |
| 6,195,773 | B1 | 2/2001 | Wada | 714/724 |
| 6,236,989 | B1 | 5/2001 | Mandyam et al. | 707/4 |
| 6,237,114 | B1 | 5/2001 | Wookey et al. | |
| 6,249,784 | B1 | 6/2001 | Macke et al. | 707/3 |
| 6,266,774 | B1 | 7/2001 | Sampath et al. | 726/24 |
| 6,321,192 | B1 | 11/2001 | Houchin et al. | 704/9 |
| 6,326,962 | B1 | 12/2001 | Szabo | 715/762 |
| 6,327,677 | B1 | 12/2001 | Garg et al. | |
| 6,357,017 | B1 | 3/2002 | Bereiter et al. | |
| 6,415,395 | B1 | 7/2002 | Varma et al. | 714/37 |
| 6,430,558 | B1 | 8/2002 | Delano | 707/5 |
| 6,539,387 | B1 | 3/2003 | Oren et al. | 707/100 |
| 6,571,236 | B1 | 5/2003 | Ruppelt | 707/3 |
| 6,587,847 | B1 | 7/2003 | Stier et al. | 706/50 |
| 6,643,801 | B1 | 11/2003 | Jammu et al. | |
| 6,708,291 | B1 | 3/2004 | Kidder | 714/39 |
| 6,738,780 | B2 | 5/2004 | Lawrence et al. | 707/101 |
| 6,738,933 | B2 | 5/2004 | Fraenkel et al. | 714/47 |
| 6,754,885 | B1 | 6/2004 | Dardinski et al. | 717/113 |
| 6,772,375 | B1 | 8/2004 | Banga | |
| 6,795,935 | B1 | 9/2004 | Unkle et al. | |
| 6,820,082 | B1 | 11/2004 | Cook et al. | 707/9 |
| 6,862,710 | B1 | 3/2005 | Marchisio | 715/501.1 |
| 6,883,120 | B1 | 4/2005 | Banga | 714/47 |
| 6,907,545 | B2 | 6/2005 | Ramadei et al. | |
| 6,909,994 | B2 | 6/2005 | Johnson et al. | |
| 7,013,411 | B2 | 3/2006 | Kallela et al. | |
| 7,058,822 | B2 | 6/2006 | Edery et al. | 726/22 |
| 7,058,861 | B1 | 6/2006 | Adams | 714/47 |
| 7,076,695 | B2 | 7/2006 | McGee et al. | 714/47 |
| 7,080,000 | B1 | 7/2006 | Cambridge | 703/21 |
| 7,120,559 | B1 | 10/2006 | Williams et al. | |
| 7,133,866 | B2 | 11/2006 | Rishel et al. | 707/3 |
| 7,155,641 | B2 | 12/2006 | Prang et al. | |
| 7,237,266 | B2 | 6/2007 | Aaron | 726/25 |
| 7,246,265 | B2 | 7/2007 | Vollmar et al. | 714/26 |
| 7,249,058 | B2 | 7/2007 | Kim et al. | |
| 7,257,514 | B2 | 8/2007 | Faihe | |
| 7,257,744 | B2 | 8/2007 | Sabet et al. | 714/56 |
| 7,284,162 | B2 | 10/2007 | Dragnea et al. | |
| 2002/0078403 | A1 | 6/2002 | Gullo et al. | 714/37 |
| 2002/0083371 | A1 | 6/2002 | Ramanathan et al. | |
| 2002/0087408 | A1 | 7/2002 | Burnett | 705/14 |
| 2002/0091671 | A1 | 7/2002 | Prokoph | 707/1 |
| 2002/0166082 | A1 | 11/2002 | Ramadei et al. | |
| 2002/0169771 | A1 | 11/2002 | Melmon et al. | 707/5 |
| 2002/0180795 | A1 | 12/2002 | Wright | 345/772 |
| 2003/0065986 | A1 | 4/2003 | Fraenkel et al. | 714/47 |
| 2003/0233438 | A1* | 12/2003 | Hutchinson et al. | 709/223 |
| 2004/0073855 | A1 | 4/2004 | Maxwell | 714/724 |
| 2004/0103309 | A1 | 5/2004 | Tracy et al. | 713/201 |
| 2004/0107405 | A1 | 6/2004 | Schein | 715/530 |
| 2004/0193907 | A1 | 9/2004 | Patanella | 713/200 |
| 2004/0225927 | A1 | 11/2004 | Warpenburg et al. | 714/47 |
| 2004/0250122 | A1 | 12/2004 | Newton | 713/201 |
| 2004/0267750 | A1 | 12/2004 | Aaron | 707/9 |
| 2005/0015667 | A1 | 1/2005 | Aaron | 714/25 |
| 2005/0038697 | A1 | 2/2005 | Aaron | 705/14 |
| 2005/0210331 | A1 | 9/2005 | Connelly et al. | 714/26 |
| 2006/0248389 | A1 | 11/2006 | Thaler et al. | 714/26 |
| 2007/0038899 | A1 | 2/2007 | O'Brien et al. | 714/47 |
| 2007/0100892 | A1 | 5/2007 | Kepart et al. | |
| 2007/0271304 | A1 | 11/2007 | Atluri | |
| 2008/0288821 | A1 | 11/2008 | Aaron | |

OTHER PUBLICATIONS

U.S. Official Action dated Jan. 28, 2009 in U.S. Appl. No. 10/611,630.
U.S. Notice of Allowance / Allowability dated Apr. 17, 2008 in U.S. Appl. No. 10/611,634.
U.S. Supplemental Notice of Allowance / Allowability dated Apr. 22, 2008 in U.S. Appl. No. 10/611,634.
U.S. Official Action dated May 21, 2007 in U.S. Appl. No. 10/610,807.
U.S. Official Action dated Nov. 21, 2006 in U.S. Appl. No. 10/610,807.
U.S. Official Action dated Jun. 19, 2006 in U.S. Appl. No. 10/610,807.
U.S. Official Action dated Dec. 29, 2005 in U.S. Appl. No. 10/610,807.
U.S. Official Action dated Oct. 3, 2007 in U.S. Appl. No. 10/611,630.
U.S. Official Action dated May 17, 2007 in U.S. Appl. No. 10/611,630.
U.S. Official Action dated Dec. 5, 2006 in U.S. Appl. No. 10/611,630.
U.S. Official Action dated Jun. 1, 2006 in U.S. Appl. No. 10/611,630.
U.S. Official Action dated Dec. 15, 2005 in U.S. Appl. No. 10/611,630.
Notice of Allowance and Allowability dated Apr. 5, 2007 in U.S. Appl. No. 10/611,637.
U.S. Official Action dated Aug. 24, 2006 in U.S. Appl. No. 10/611,637.
U.S. Official Action dated Mar. 29, 2006 in U.S. Appl. No. 10/611,637.
U.S. Official Action dated Dec. 21, 2005 in U.S. Appl. No. 10/611,637.
U.S. Official Action dated Sep. 10, 2007 in U.S. Appl. No. 10/611,634.
U.S. Official Action dated Mar. 29, 2007 in U.S. Appl. No. 10/611,634.
U.S. Official Action dated Sep. 20, 2006 in U.S. Appl. No. 10/611,634.
U.S. Official Action dated Mar. 29, 2006 in U.S. Appl. No. 10/611,634.
Website Article entitled, "A New Architecture for Managing Enterprise Log Data," by Adam Sah of Addamark Technologies, Inc., dated May 24, 2006. Presented at the LISA 2002: Sixteenth Systems Administration Conference, Berkeley, California: USENIX Association, 2002. pp. 1-8, and 17-26; (blank pages removed).
U.S. Official Action dated Aug. 19, 2009 in U.S. Appl. No. 10/611,630.
U.S. Official Action dated Oct. 1, 2009 in U.S. Appl. No. 12/139,749.
U.S. Official Action dated Jan. 25, 2010 in U.S. Appl. No. 10/611,630.
U.S. Official Action dated Mar. 9, 2010 in U.S. Appl. No. 12/139,749.

* cited by examiner

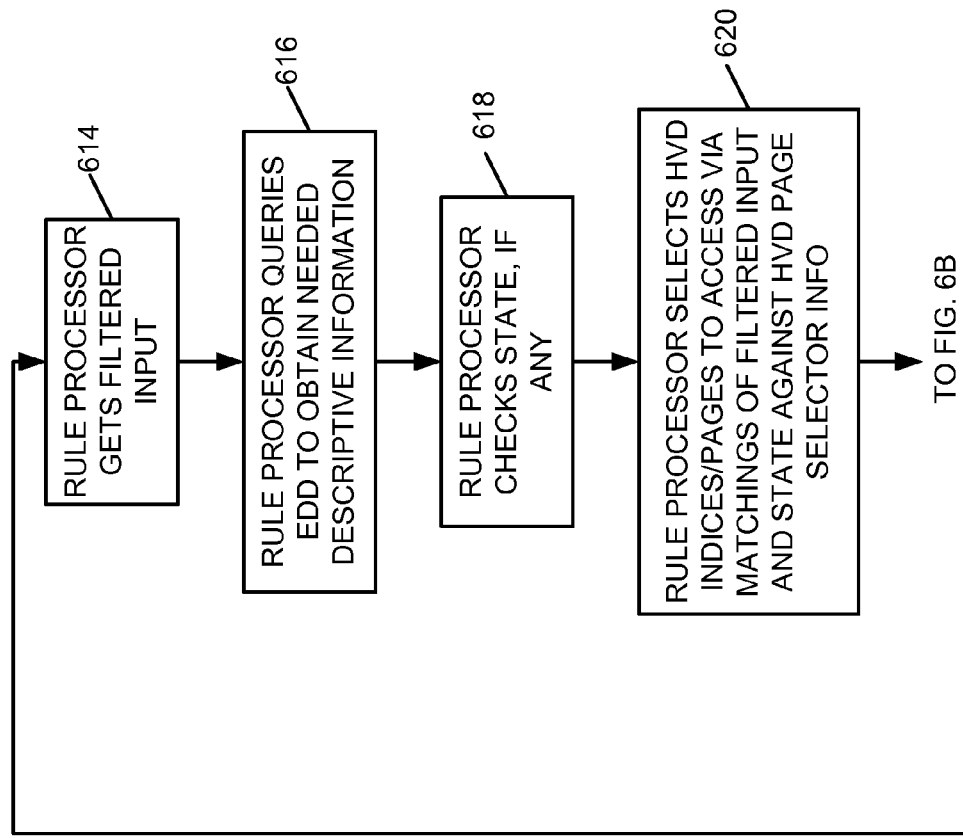
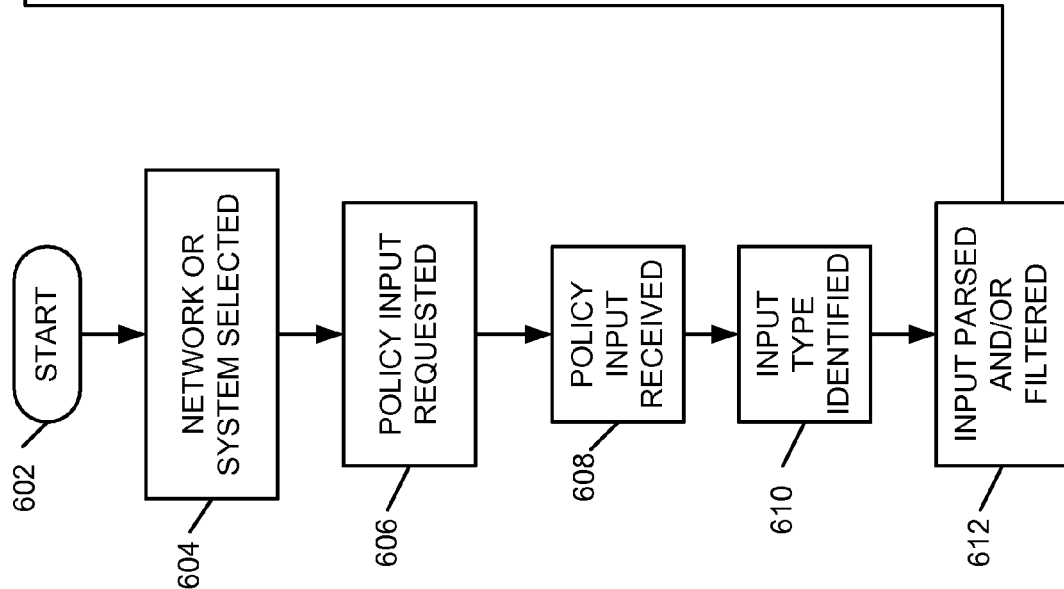
FIG. 6A

ELECTRONIC VULNERABILITY AND RELIABILITY ASSESSMENT

CROSS REFERENCE TO RELATED APPLICATIONS

This patent application is a divisional of U.S. patent application Ser. No. 10/611,637, now U.S. Pat No. 7,237,266 entitled "Electronic Vulnerability and Reliability Assessment," filed Jun. 30, 2003, which is herein incorporated by reference in its entirety.

TECHNICAL FIELD

The present invention is generally related to computer systems and, more particularly, is related to network management and troubleshooting systems.

BACKGROUND OF THE INVENTION

Electronic networks are increasingly becoming more complex. Typically these networks include a plurality of processing devices, communications systems, software, routing elements, and security intrusion protection, etc. Managing and controlling components of these complex networks has become challenging due to the large number of elements included in the networks. In addition, administration of an electronic network involves understanding policies for use and protection of the network elements and the characteristics of the network that are unique to each customer.

Administrators of electronic networks continue to be concerned with reliability and security of these complex networks, among other concerns. Because of the large number of elements of the network, it may not be readily apparent to the administrators, which components or portions of the network are vulnerable to failure or unauthorized intrusion. As a result, the administrators may be unable to determine what, if any impact system or policy changes will have on the network. Without this knowledge, administrators may unintentionally implement policies that negatively impact the reliability and/or security of the network.

Thus, heretofore-unaddressed needs exist for a solution that addresses the aforementioned deficiencies and inadequacies.

SUMMARY OF THE INVENTION

Preferred embodiments of the present invention provide a system and method for electronic vulnerability and reliability assessment.

Briefly described, in architecture, one embodiment of the system, among others, can be implemented to include a database populated with descriptive system information and a database structure configured as a hierarchical plurality of database pages configured to include element vulnerability information and links to related database pages. A rule processor module is configured to provide rules for cycling through the database structure to match keywords provided by user input with element vulnerability information from the database structure.

Preferred embodiments of the present invention can also be viewed as providing methods for the electronic profile and policy vulnerability and reliability assessment. In this regard, one embodiment of such a method, among others, can be broadly summarized by the following steps: populating a database with element or system vulnerability information; obtaining policy-based descriptive information for the system; and selecting database pages to access from a database structure configured as hierarchical plurality of database pages; and utilizing keyword matching to obtain vulnerability information for the element or combination of elements.

Other systems, methods, features, and advantages of the present invention will be or become apparent to one with skill in the art upon examination of the following drawings and detailed description. It is intended that all such additional systems, methods, features, and advantages be included within this description and be within the scope of the present invention.

BRIEF DESCRIPTION OF THE DRAWINGS

Many aspects of the invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

FIGS. 6A and 6B are flowcharts depicting more specific functionality, in accordance with one preferred embodiment, of an implementation of electronic profile and policy vulnerability and reliability assessment.

DETAILED DESCRIPTION OF THE PREFERRED EMBODIMENTS

Disclosed herein are systems and methods for the electronic profile and policy vulnerability and reliability assessment. To facilitate description, an example system that can be used to implement the electronic profile and policy vulnerability and reliability assessment is discussed with reference to the figures. Although this system is described in detail, it will be appreciated that this system is provided for purposes of illustration only and that various modifications are feasible without departing from the inventive concept. After the example system has been described, an example of operation of the system will be provided to explain the manner in which the system can be used to provide the electronic profile and policy vulnerability and reliability assessment.

Figure 1:
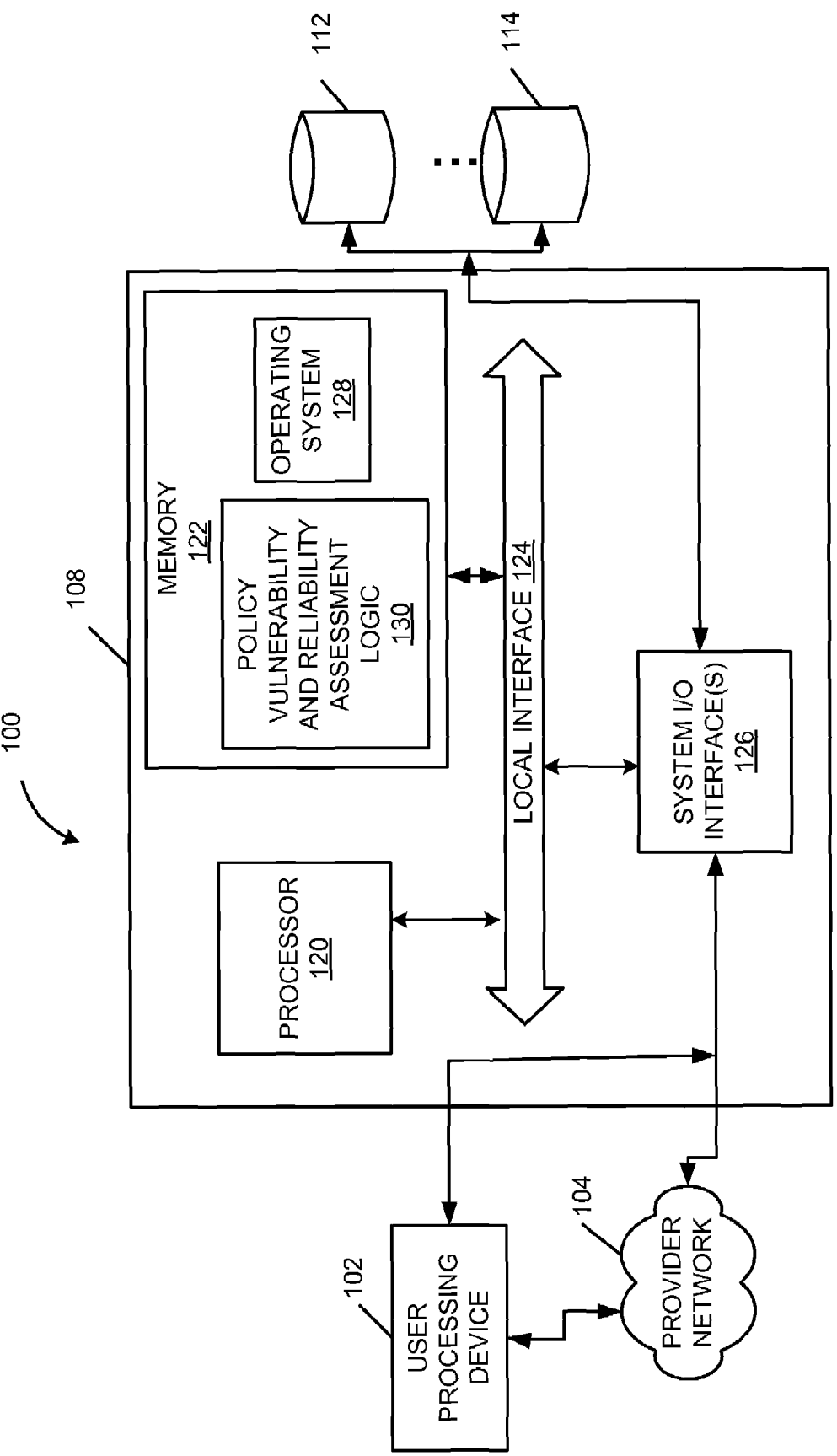
FIG. 1 is a block diagram depicting a preferred embodiment of a system for electronic profile and policy vulnerability and reliability assessment.

Referring now in more detail to the drawings, in which like numerals indicate corresponding parts throughout the several views, FIG. 1 is a block diagram depicting a preferred embodiment of a system 100 for electronic profile and policy vulnerability and reliability assessment. The system 100 includes a user processing device 102, a provider network 104, a computing device 108 that depicts an illustrative example of an implementation of electronic profile and policy vulnerability including logic configured to provide for profile and policy vulnerability assessment information, and a plurality of databases 112, 114. In one preferred embodiment, information stored in databases 112, 114 is organized as field, records, or files, etc. In another preferred embodiment, the databases 112, 114 are accessible to the computing device 108 via a system I/O interface 126. In yet another preferred embodiment, the computing device 108 is configured to include the databases 112, 114 in memory. In still another preferred embodiment, the databases reside on a storage server (not shown) accessible by the computing device 108.

The provider network 104 may be any type of communications network employing any network topology, transmission medium, or network protocol. For example, such a network may be any public or private packet-switched or other data network, including the Internet, circuit-switched network, such as a public switch telecommunications network (PSTN), wireless network, or any other desired communications infrastructure and/or combination of infrastructure. In an alternative preferred embodiment, the user could interact directly with the computing device 108.

Generally, in terms of hardware architecture, as shown in FIG. 1, the computing device 108 includes, inter alia, a processor 120 and memory 122. Input and/or output (I/O) devices (or peripherals) can be communicatively coupled to a local interface 124 via a system I/O interface 126, or directly connected to the local interface 124. The local interface 124 can be, for example but not limited to, one or more buses or other wired or wireless connections, as is known in the art. The local interface 124 may have additional elements, which are omitted for simplicity, such as controllers, buffers (caches), drivers, repeaters, and receivers, to enable communications. Further, the local interface may include address, control, and/or data connections to enable appropriate communications among the aforementioned components.

The processor 120 is a hardware device for executing software, particularly that stored in memory 122. The processor 120 can be any custom made or commercially available processor, a central processing unit (CPU), an auxiliary processor among several processors, a semiconductor based microprocessor (in the form of a microchip or chip set), a macroprocessor, or generally any device for executing software instructions.

The memory 122 can include any one or combination of volatile memory elements (e.g., random access memory (RAM, such as DRAM, SRAM, SDRAM, etc.)) and nonvolatile memory elements (e.g., ROM, hard drive, tape, CDROM, etc.). Moreover, the memory 122 may incorporate electronic, magnetic, optical, and/or other types of storage media. Note that the memory 122 can have a distributed architecture, where various components are situated remote from one another, but can be accessed by the processor 120.

The software and/or firmware in memory 122 may include one or more separate programs, each of which comprises an ordered listing of executable instructions for implementing logical functions. In the example of FIG. 1, the software in the memory 122 can include policy vulnerability and reliability assessment logic 130, and a suitable operating system (O/S) 128. The operating system essentially controls the execution of other computer programs, and provides scheduling, input-output control, file and data management, memory management, and communication control and related services.

The logic 130 is a source program, executable program (object code), script, or any other entity comprising a set of instructions to be performed. When the logic 130 is implemented as a source program, then the program needs to be translated via a compiler, assembler, interpreter, or the like, which may or may not be included within the memory 122, so as to operate properly in connection with the O/S. Furthermore, logic 130 can be written as (a) an object oriented programming language, which has classes of data and methods, or (b) a procedure programming language, which has routines, subroutines, and/or functions, for example but not limited to, C, C++, Pascal, Basic, Fortran, Cobol, Perl, Java, and Ada.

The I/O devices may include input devices, for example but not limited to, a keyboard, mouse, scanner, microphone, etc. Furthermore, the I/O devices may also include output devices, for example but not limited to, a printer, display, etc. The I/O devices may further include devices that communicate both inputs and outputs, for instance but not limited to, a modulator/demodulator (modem; for accessing another device, system, or network), a radio frequency (RF) or other transceiver, a telephonic interface, a bridge, a router, etc. Finally, I/O 126 may couple to the provider network 104 that is configured to communicate with the user processing device 102.

When the logic 130 is implemented in software, as is shown in FIG. 1, it should be noted that logic 130 can be stored on any computer-readable medium for use by or in connection with any computer related system or method. The logic 130 can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can store, communicate, propagate, or transport the program for use by or in connection with the instruction execution system, apparatus, or device. The computer-readable medium can be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM, EEPROM, or Flash memory) (electronic), an optical fiber (optical), and a portable compact disc read-only memory (CDROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory.

In an alternative embodiment, where the logic 130 is implemented in hardware, the logic 130 can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

Figure 2:
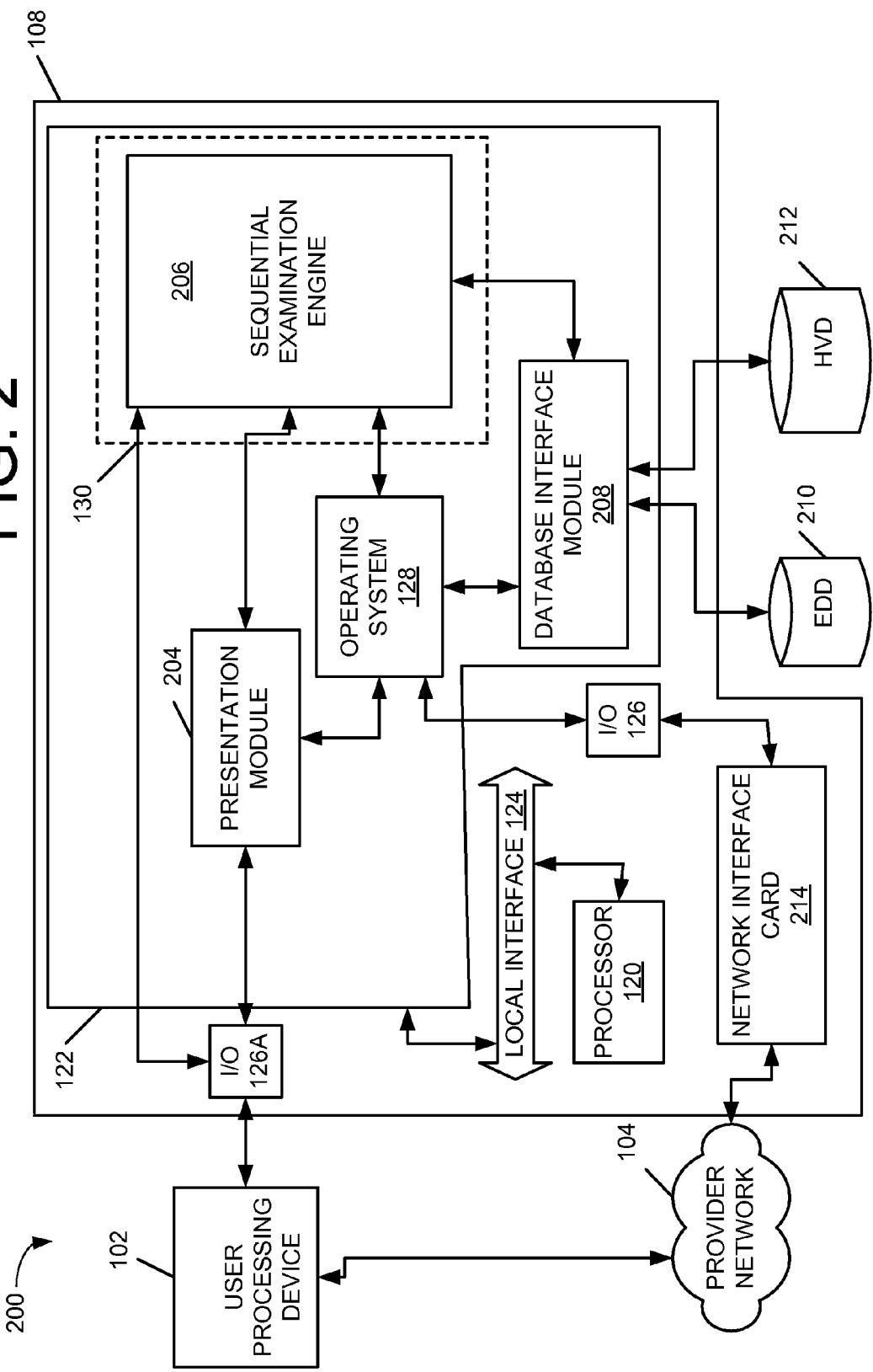
FIG. 2 is a block diagram depicting a more detailed illustrative example of a preferred embodiment of a system for providing electronic profile and policy vulnerability and reliability assessment.

FIG. 2 is a block diagram depicting a more detailed illustrative example of a preferred embodiment of a system 200 for providing electronic profile and policy vulnerability and reliability assessment. The system 200 includes the computing device 108 that communicates with the user processing device 102, provider network 104, databases 112, 114 configured as an index database (EDD) 210 and a deep database (HVD) 212. The computing device 108 further includes a presentation module 204, memory 122 having operating system 128 and logic 130 configured as a sequential examination engine 206, and system interfaces 126, 126A. Further, computing device 108 includes local interface 124, processor 120, and network interface card 214. In an example, the user processing device 102 communicates with the computing device 108 via the I/O 126A. In another preferred embodiment, the user processing device 102 communicates with the computing device 108 via the provider network 104. In a preferred embodiment, the network interface card 214, I/O 126, and database interface modules 208 are utilized for communicating between the provider network 104 and databases EDD (element descriptive database) and HVD (hierarchical vulnerability database) 210, 212.

1. Sequential Examination Engine

The sequential examination engine (SEE) 206 provides an interface and algorithmic intelligence between the user processing device 102, presentation module 204 and the databases 210, 212 via the database interface module 208. In a preferred embodiment, the SEE 206 is configured to receive user input requesting policy and/or profile information for an element or combination of elements of a network or system and to access the databases 210, 212 to obtain a result. Preferably, the SEE 206 accesses the EDD 210 for element descriptions of the selected network/system (as well as customer records) and cycles through the HVD 212 starting at a general level for each element, examining each level until every possible vulnerability for that element has been examined. After all elements or combination of elements have been examined, the results are accumulated and made available to the presentation module 204 and/or the user's processing device 102.

2. Presentation Module

The presentation module 204 summarizes and formats the accumulated vulnerability results in an appropriate manner to be informative and useful to a user. In one preferred embodiment, the presentation module 204 utilizes software engineering to accomplish the presentation of accumulated vulnerability results to the user. For example, application programming interfaces can be utilized that are consistent with the user's operating system such as Unix, Linux, Windows, etc., with specific configurations being dependent upon the user's particular implementation. In another preferred embodiment, the presentation module 204 includes functionality to eliminate repetitious information in the results stored from each cycle and cycle set, for instance, by searching within the accumulated vulnerability information for identical material and deleting subsequent occurrences so that the final results presented to the user do not exhibit any redundancies. Intermediate accumulated vulnerability results (i.e., accumulated after the completion of each cycle set) are presented to the user so that the user can monitor the process and take action if needed, for example, to abort and restart the process with corrected policy and/or profile input. In addition, the presentation module 204 allows the user to terminate or modify the process as needed. For example, when the monitored results are not satisfactory, or early-found vulnerabilities are so severe that the user recognized that major policy changes are required, the user may choose to immediately modify the input accordingly and re-start the examination with corrected policy interaction. In one preferred embodiment, the process continues to completion without user input. In an alternative preferred embodiment, when intermediate accumulated results are presented to the user, a portion of that information accessed from the HVD 212 as a result of the cycle just completed can include pertinent questions associated with specific keywords. The user can be prompted for additional input at the end of a cycle in which some degree of uncertainty has occurred such that the vulnerability results could be improved with additional input. This input becomes keywords for matching in the HVD 212 during the next cycle via the action of an input parser/filter module (shown in FIG. 3). In addition, the presentation module 204 preferably provides keywords associated with any current prompting to the input parser/filter module (shown in FIG. 3) so that user input/responses to that prompting can be associated with the pertinent keywords, such that the keywords can be provided to the rule processor module (shown in FIG. 3). In an alternative embodiment, where keywords are not actually extracted from the user, but rather the user answers a specific prompt with a yes or no, when the response is yes, the keyword associated with that prompt is provided to the rule processor module (shown in FIG. 3).

3. Database Interface Module

The database interface module 208 provides standard functionality utilizing, for instance, a structured query language to enable provisioning and access of the databases EDD 210 and HVD 212. In an alternative preferred embodiment, an additional interface, such as a provisioning interface can be provided which provides for provisioning of the databases.

4. Databases

In a preferred embodiment, the HVD 212 is pre-provisioned with descriptive vulnerability and reliablity data such that correct results can be achieved. Preferably, data in the HVD 212 is arranged hierarchically and includes a plurality of database pages (shown in FIG. 4) having a page index, data section and selector section. The HVD 212 is preferably organized in a database structure of HVD pages as a range of information or as a continuum into a set of discrete stages that allow for repeated progression into deeper stages utilizing a sequence of questions and answers that an expert would typically utilize to progress accurately from each stage to the next.

For example, a top section of the HVD structure includes information necessary to identify broad categories of security or reliability vulnerabilities based on general information regarding system and/or network elements. An inquiry to a bottom section of the HVD structure results in specific vulnerability information resulting from a sequential process of delving further and further into details regarding the system/network elements, and provides specific advice for remedial action. Intermediate sections of the HVD structure are preferably pre-provisioned with information and questions/answers that allows a rule processor (shown in FIG. 3) to proceed from a top HVD page to the desired bottom page(s), and allows for branching to related HVD pages as needed to identify all associated helpful information.

In a preferred embodiment, the EDD 210 includes descriptive information for the elements of the customer's network or system, customer records, and any other pertinent customer information.

Figure 3:
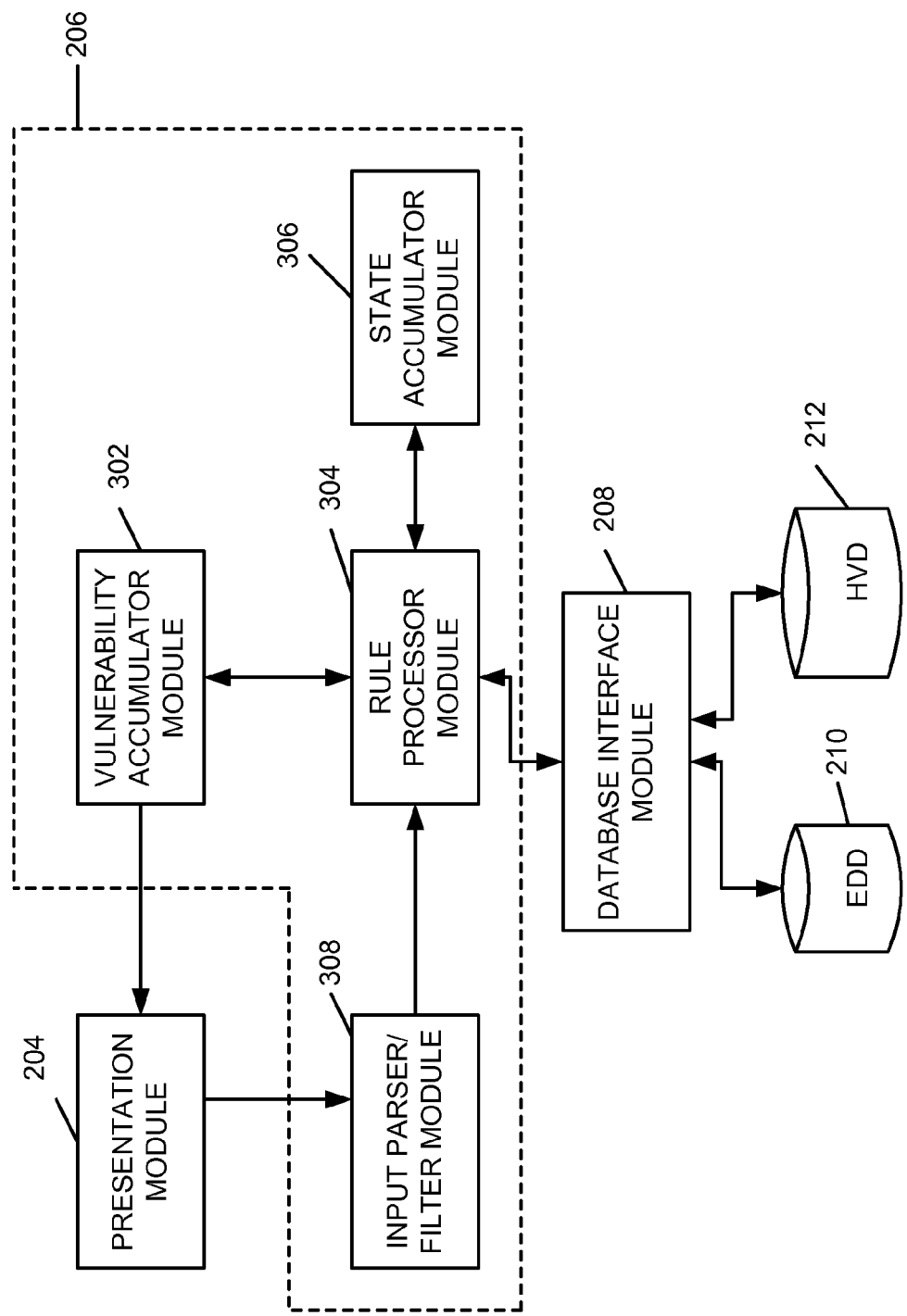
FIG. 3 is a block diagram of an illustrative example of a preferred embodiment of modules of a sequential examination engine of a system for electronic profile and policy vulnerability and reliability assessment.

FIG. 3 is a block diagram of an illustrative example of a preferred embodiment of modules of a sequential examination engine 206 of a system for electronic profile and policy vulnerability and reliability assessment. In a preferred embodiment, the sequential examination engine 206 includes a vulnerability accumulator module 302 that communicates with the presentation module 204 and a rule processor module 304, a state accumulator module 306 that communicates with the rule processor module 304, and an input parser/filter module 308 that communicates with the rule processor module 304, presentation module 204 and the user processing device 102 (not shown in FIG. 3).

5. Input Parser/Filter Module

The input parser/filter module 308 receives policy/profile input from a user's processing device 102 in a plurality of formats, such as data files of an acceptable format, or other input either automatically provided by a policy/profile management application or manually in response to prompting from the presentation module 204, among others. In one preferred embodiment, the input parser/filter module 308 utilizes standard software engineer techniques to convert the input data usable by the rule processor module 304. The input parser/filter module 308 preferably interacts with the user's processing device 102 via application programming interfaces that are consistent with the user's operating system, for instance, Unix, Linux, windows, etc., with the details of the interfaces being dependent upon the specific implementation including the choice of software language and design. In a preferred embodiment, the implementation is selected to perform the specific conversions needed for each allowed input type. During the conversion process, the input parser/filter module 308 filters out extraneous data, such that only pertinent input remains. Further, the input parser/filter module 308 receives keyword information from the presentation module 204 regarding any current prompting provided to the user so that user responses to that prompting can be associated with those pertinent keywords.

6. Rule Processor Module

Figure 7:
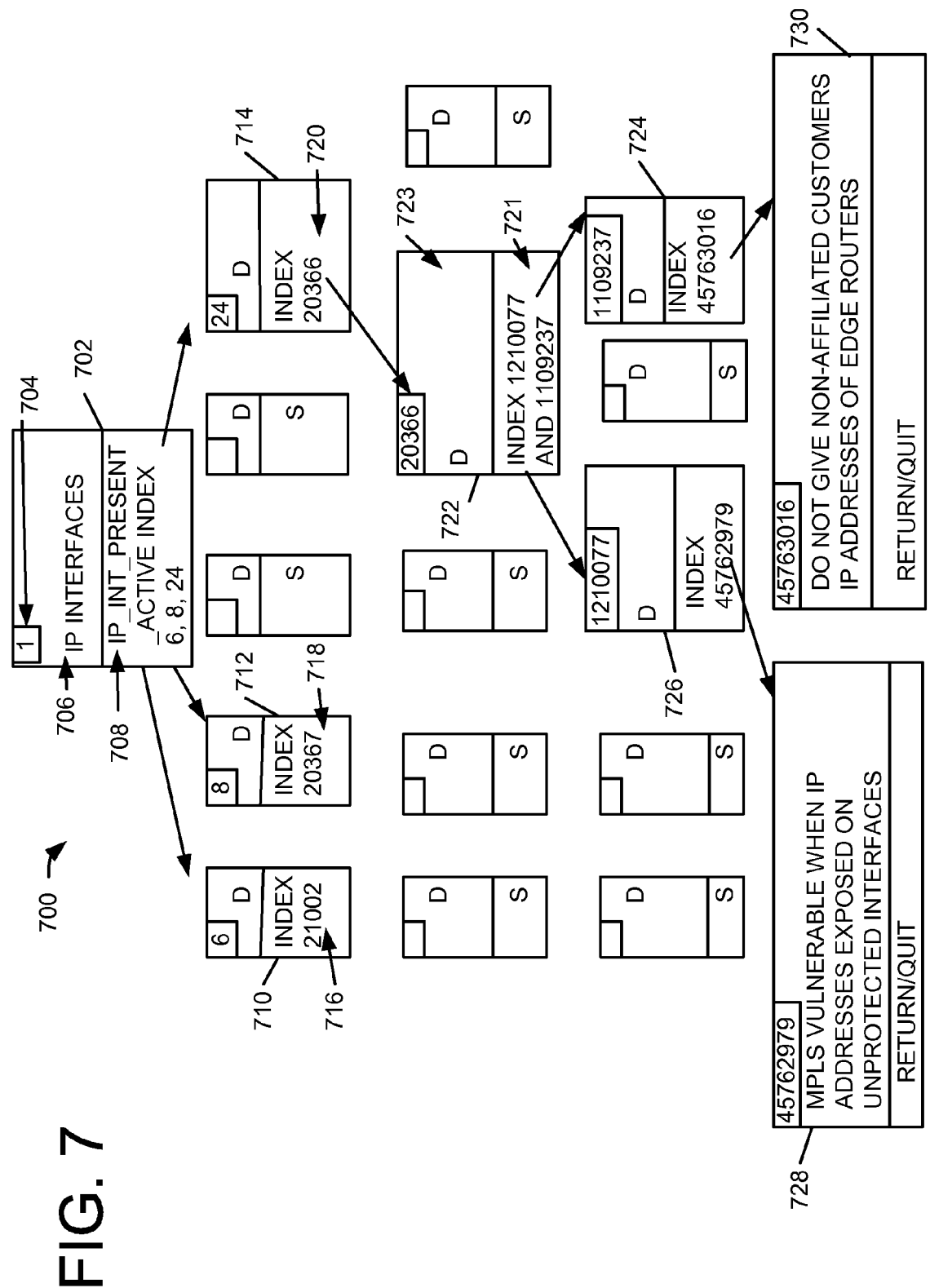
FIG. 7 is an illustrative example of a preferred embodiment of cycling through a hierarchical vulnerability database structure of a system for electronic profile and policy vulnerability and reliability assessment.

The rule processor module 304 cycles through the process shown in FIG. 7 for each element under examination, then for any combination of elements as needed, gathering additional vulnerability information that is accumulated or stored in the state accumulator module 306 until complete vulnerability results are obtained for each element, and then finally for the system under examination as a whole. Preferably, the rule processor module 304 receives input from the input parser/filter module 308. The rule processor module 304 queries the EDD 210 to obtain pertinent descriptive information for the system under examination, including the elements of that system and how they are related or connected. Subsequently, the rule processor module 304 checks the "state" via the state accumulator module 306. A state is comprised of summary and/or special information obtained from the HVD 212 in previous cycles, or obtained from the EDD 210, for the purpose of potentially aiding or modifying subsequent keyword matching/filtering (in various ways as described later). For the first element of the system under examination, and later for subsequent elements and element combinations, the rule processor module 304 selects the HVD indices/pages to access via keyword matching between (a) the filtered policy/profile input for the system under examination along with any "special state" info (if any), and (b) the information contained in the HVD page selector. After accessing the selected HVD pages, the rule processor module 304 sends the pertinent vulnerability information (i.e., the data section of a HVD page) from these pages to the vulnerability accumulator module 302, retains the new selector information (i.e., selector section of a HVD page), updates the "state" in the state accumulator module 306 as appropriate by for example, adding the HVD indices of pages just accessed. In addition, the rule processor module 304 either (i) loops back to obtain additional input to continue accessing deeper levels of the HVD 212 for the same element, (ii) begins cycling for a subsequent element or element combination, or (iii) finishes by updating the EDD system-descriptive information with the element counter value (e.g., indicating the breadth/extent of the process just concluded) and the final vulnerability findings (e.g., the list of pages/indices accessed to provide the final accumulated results for the examined system as a whole). In an alternative embodiment, the rule processor module 304 is configured to utilize accumulated state information from the state accumulator module 306 to modify the matching or filtering of keywords, such that a likelihood of success of a probability of matching or filtering of keywords is changed based upon probabilistic, statistical, conditional pre-requisite item, occurrence, situation, or rules information.

7. State Accumulator Module

The state accumulator module 306 stores intermediate status and result information that provides for keeping track of progress and for appropriately selecting the subsequent database accesses for each cycle of additional user input and database access/result determination. The state accumulator module 306 stores both the list of pages (via indices) accessed and any special state information. In an example, special state information provides a mechanism for adding in or subtracting from the matching process for a specified keyword, in a circumstance where matching is not all or none but rather is by degree where the matching must for example exceed a pre-specified threshold in order to qualify as a match. In one preferred embodiment, the state accumulator module 306 provides a short-term memory that is utilized until the set of cycles associated with the examination of one policy/profile-managed system, which preferably includes all the sets of cycles for each element and element combinations considered, is completed and the final accumulated vulnerabilities are presented to the user. At the conclusion of this superset of cycles, the state is reset, or alternatively, the state is reset at the start of the next superset.

8. Vulnerability Accumulator Module

The vulnerability accumulator module 302 stores intermediate results. The results of each cycle of additional user input and database access/result determination are added to the vulnerability accumulator module 302. In one preferred embodiment, at the end of the entire superset of cycles and preferably while the examination is still underway, as well as at the end of each set of cycles for each element and element combination that has been completed, the vulnerability accumulator module 302 contains the resulting identified vulnerabilities for each element and element combination considered at that point. Eventually the vulnerability accumulator module 302 contains results for the examined system as a whole, and makes the results available to the user's processing device 102 via the presentation module 204.

Figure 4:
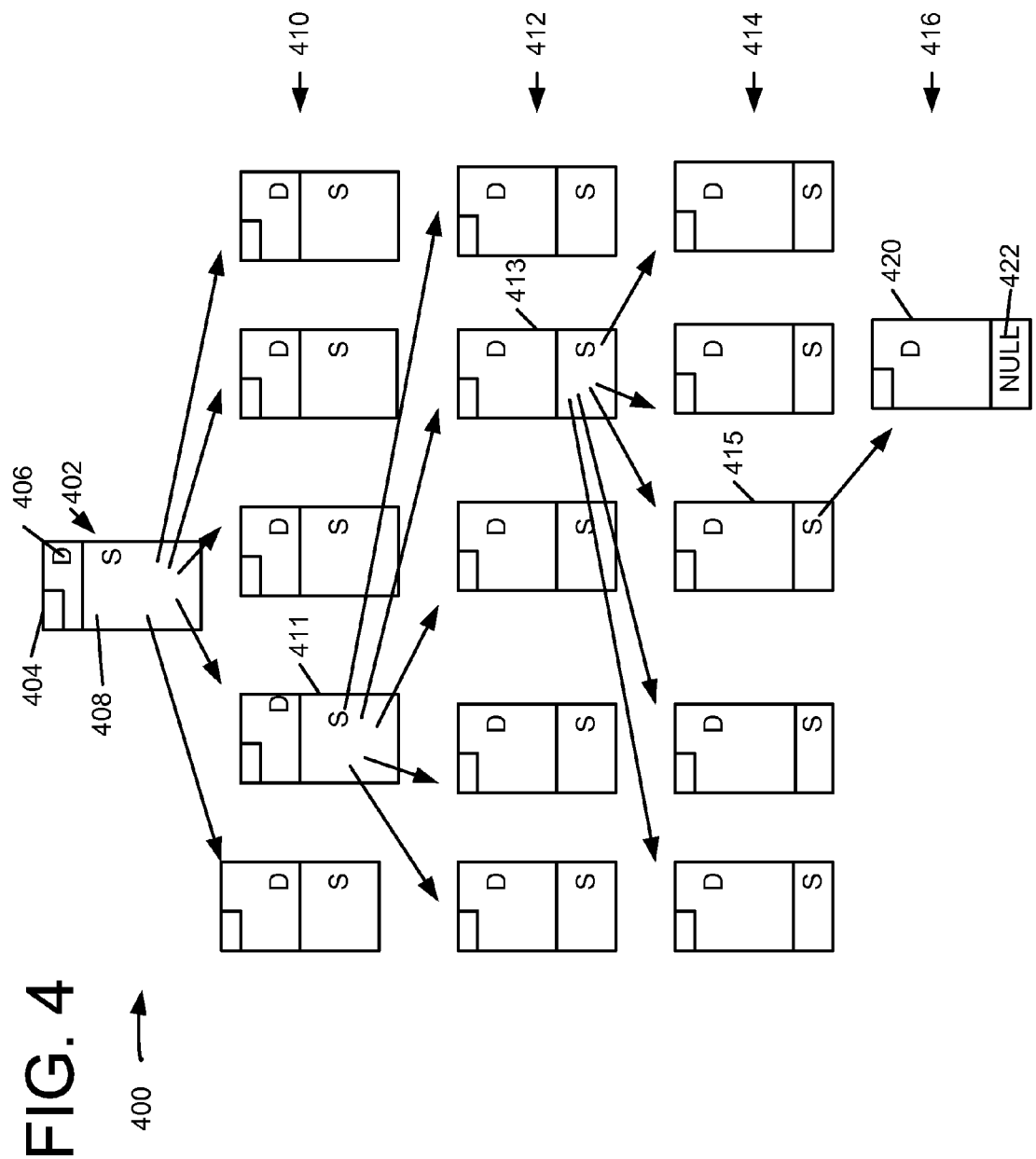
FIG. 4 is a block diagram of an illustrative example of a preferred embodiment of a hierarchical vulnerability database structure of a system for electronic profile and policy vulnerability and reliability assessment.

FIG. 4 is a block diagram of an illustrative example of a preferred embodiment of a hierarchical vulnerability structure database (HVD structure) 400 of a system for electronic profile and policy vulnerability and reliability assessment. The HVD structure 400 includes a plurality of database pages such as page 402. The database page 402 includes a page index 404, a data section 406 and a selector selection 408. The database pages 402 may also be referred to as entries or forms. The page index 404 preferably includes an index number and a descriptive title. In a preferred embodiment, the page index 404 is utilized by the HVD structure 400 to retrieve the appropriate database page 402.

The data section 406 includes the actual information and data accumulated and presented to the user regarding details of the identified vulnerability results. The selector section 408, in a preferred embodiment encompasses one or more independent lines of data, includes up and down links to related database pages. In a preferred embodiment, the selector section 408 includes one or more index numbers as a database link to any related pages and a matching field which contains a list of keywords, associated numeric ranges, etc., all of which can be used in the matching process to select subsequent pages to access. Thus, in a preferred embodiment, each independent line of the selector section contains one or more keywords plus one or more specific database page link indices with which these keywords are specifically associated (as well as optional data such as related numeric ranges for alternate or advanced matching/filtering). In an alternative embodiment, the selector section 408 includes an empty or "null" downward-pointing indicator line if the page is a "bottom page."

In the illustrative example shown in FIG. 4, a cycle typically begins at the top database page 402. In an example, the database page 402 contains mostly selector section information. The database pages at level 410 each include selector section 408 information, however, the amount of solution data in the data section 406 is increasing. At level 412, the database pages include less selector section 408 information and more solution data in the data section 406. At level 414, the database pages include more detailed solution data in the data section 406 and very little information in the selector section 408. Level 416 shows the bottom of the HVD structure 400 for the illustrative example. Database page 420 includes a null section 422 indicating that this page is the bottom page. The bottom database page 420 does not include downward pointing selector information and thus, a cycle stops at this page unless the cycle was previously stopped.

As shown in FIG. 4, the database pages are preferably organized in a hierarchical structure. For example, a cycle or search typically begins at HVD page 402. The selector section 408 of this page 402 provides links to a number of related pages. In an example, only one page, for example, HVD page 411 contains relevant information. Another cycle based on keywords identified in HVD page 411 uncovers links to the next level of HVD pages with HVD page 413 providing relevant information. Another cycle based on keywords identified in HVD page 413 reveals a link to HVD page 415. Another cycle based on keywords identified in HVD page 415 reveals a link to HVD page 420. In this example, HVD page 420 is the bottom page, as indicated by the null 422 reference, and thus no downward pointing selector information is available and the cycle ends.

Figure 5:
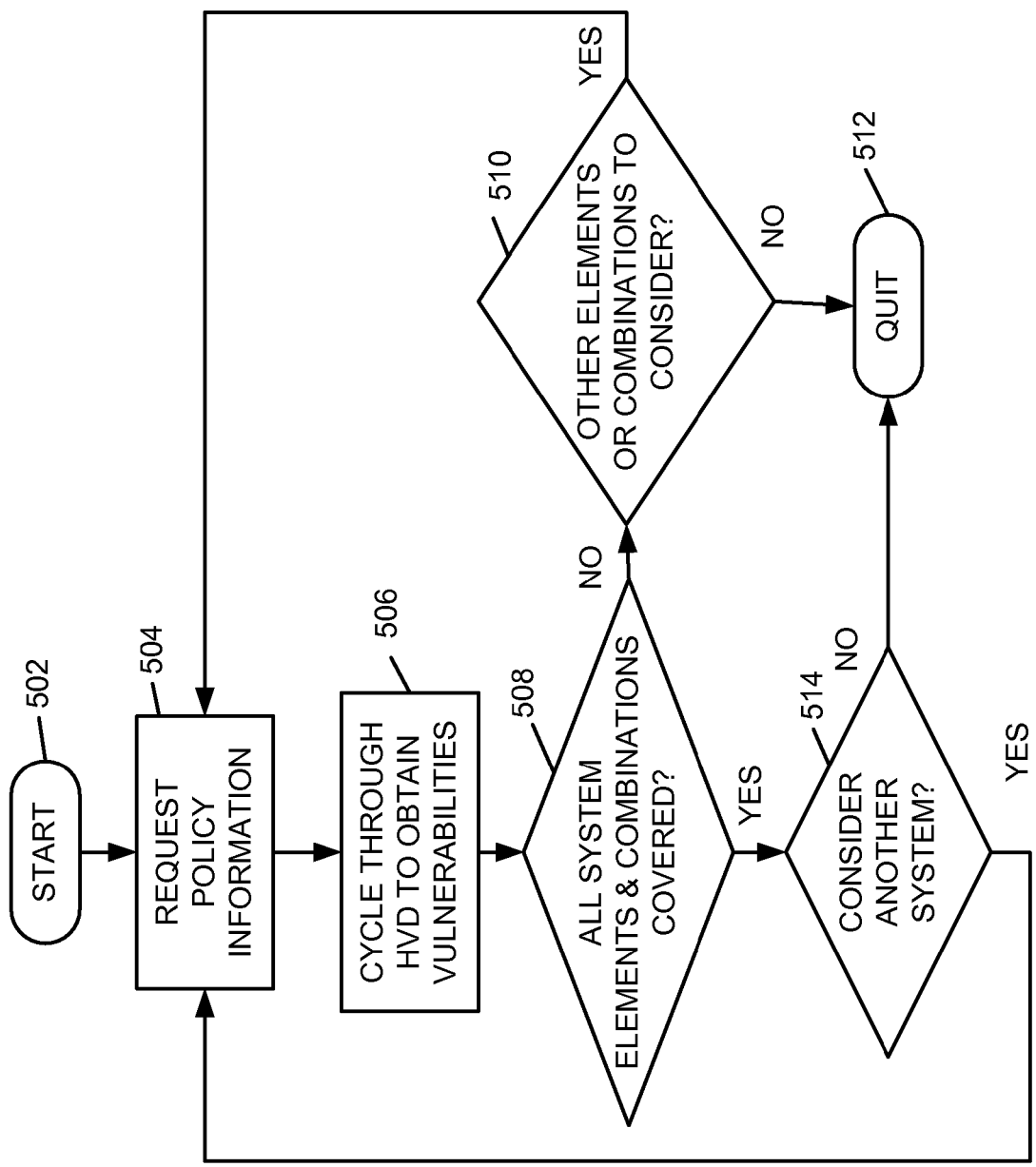
FIG. 5 is a flowchart depicting general functionality, in accordance with one preferred embodiment, of an implementation of electronic profile and policy vulnerability and reliability assessment.

FIG. 5 is a flowchart depicting general functionality (or method), in accordance with one preferred embodiment, of an implementation of electronic profile and policy vulnerability and reliability assessment. The process begins at 502. At 504, a user requests or inputs policy information to assist in identifying security and/or reliability related vulnerabilities of computer and/or network systems. The user can submit the request or policy information via numerous formats including email, web form, policy management application file, automatically generated files such as firewall or intrusion detection system logs, electronic interactive form input filled out by a customer representative talking with a customer, input in response to prompting from a presentation module, among others. In a preferred embodiment, the user's request for information is converted into data usable by a rule processor module. At 506, the rule processor module (or other searching processing devices) cycles through databases, such as the hierarchical vulnerability database to obtain a reply to the user's request for information. At 508, the user determines if the reply answers the question or request for vulnerability information by considering each network/system element (or combination of elements) separately, i.e. by determining its potential vulnerabilities alone (or as a particular specified combination). If not, at 510, a determination is made as to whether to consider additional elements or combinations. If so, the process continues at 504 with the next element or combination. If consideration of further elements or combination is unnecessary, the process ends at 512. If all necessary elements and combinations have been considered, at 514, the user has the option to consider another network or system. If the user chooses to consider another network or system, the process begins again at 504 with the user requesting vulnerability information for that network or system. If the user does not choose to ask another question, the process ends at 512.

Figure 6B:
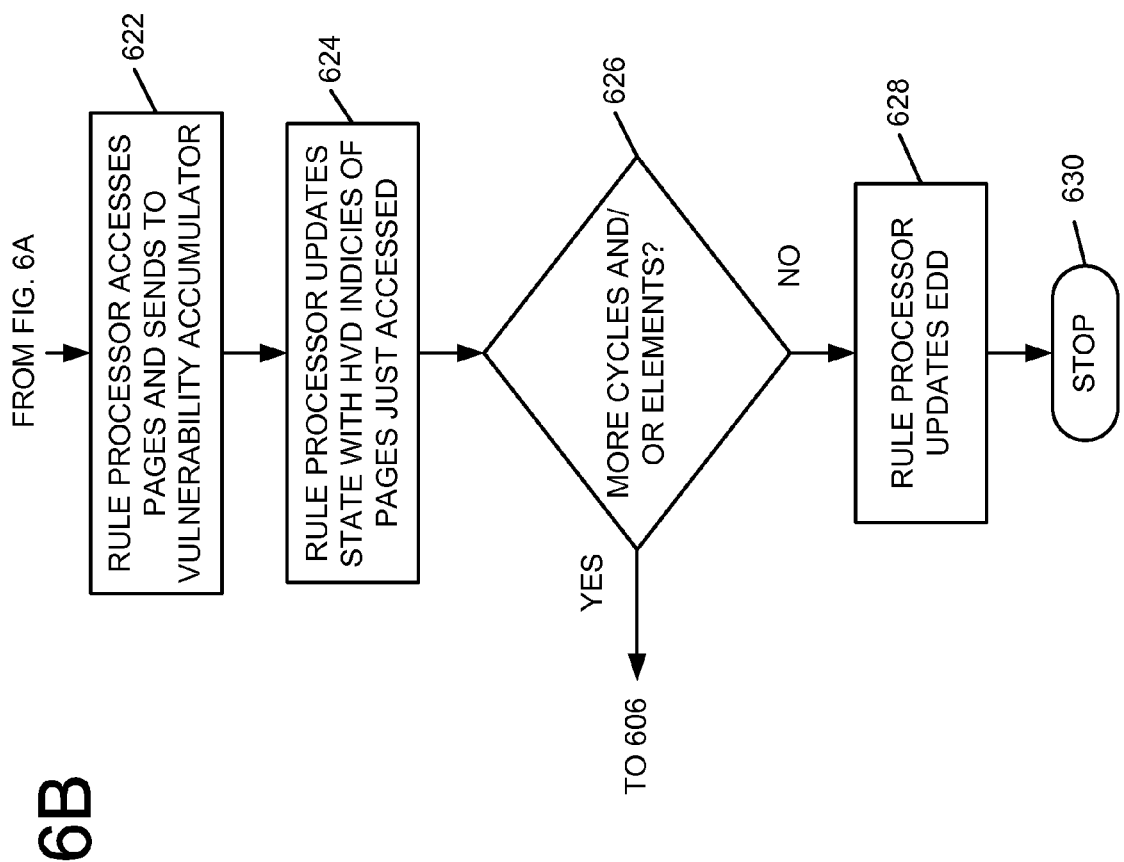

FIGS. 6A and 6B are flowcharts depicting more specific functionality (or methods), in accordance with one preferred embodiment, of an implementation of electronic profile and policy vulnerability and reliability assessment. The process begins at 602. At 604, the network or system is selected in order to identify the user so that the appropriate set of information contained in the EDD (which may contain information associated with many different networks or systems) can be appropriately selected and accessed. The element counter is set to 1, and the cycle counter is set to 1. In an alternate preferred embodiment, a combination counter is also set to 1, while a cumulative cycle counter is set to zero. At 606, policy input is requested. In a preferred embodiment, a user's processing device configured to interact with a presentation module is utilized to query the user. At 608, the policy input is received. Policy input can be received via a plurality of mechanisms, including input received directly from the user, email, policy management application file, web page form, or pager, or a combination of these inputs, among others. At 610, the input type is identified. For instance, the input is identified as being manual, application file, web form, log file, email, or a combination of these types of input, among others. At 612, the input is parsed and/or filtered such that only potentially useful information remains. At 614, in a preferred embodiment, a rule processor module receives the filtered input. Preferably, the filtered input is provided in a format that is suitable for matching with data selector information of a database page of a hierarchical vulnerabilities database (HVD). At 616, the rule processor module queries an element descriptive database (EDD) to obtain descriptive information regarding the elements of the system/network and how they are related or connected, as well as user records (or profile) information. At 618, the rule processor module checks for any "states" via the state accumulator module. The state is comprised of summary and/or special information obtained from the HVD in previous cycles, or obtained from the EDD, for the purpose of potentially aiding or modifying subsequent keyword matching/filtering (in various ways, some of which are described for purposes of example in the several paragraphs following). At 620, the rule processor module selects the HVD indices and/or pages to access utilizing the matching of the filtered input and state information against the HVD page selector information. In a preferred embodiment, the rule processor module begins at a top page of the HVD structure on the first cycle. A portion of each HVD page includes selector information that is matched against the next cycle. In a preferred embodiment, the rule processor module performs matching to determine the next HVD page or pages to access by performing a matching between (a) the filtered input plus any special state information, if any, and (b) the information contained in the HVD page selector from the last HVD page or pages accessed. In one preferred embodiment, these matches consist of whether keywords are present or not in both the filtered input and the currently held page selector information. If simultaneously present, there is a match, and the associated page index or indices within that line of the page selector information provides the identification of subsequent pages to be accessed. In an alternative preferred embodiment, a more complex match "by degree" is also possible, utilizing "special state" information in the form of positive or negative numerical values which are combined with numerical values assigned to certain keywords to determine whether pre-set thresholds are exceeded. If exceeded, then there is a match and the associated page index or indices within that line of the page selector information provide the identification of subsequent pages to be accessed. The special state information, assigned keyword numerical values, and the pre-set thresholds can be part of the data or selector areas on any HVD page, and if encountered are held in the state accumulator module until it is reset at the beginning of the next inquiry. When the special state information occurs in an early cycle this causes an increased or decreased sensitivity to the occurrence of specified keywords which may be encountered in later cycles (within the same set of cycles), and provides additional flexibility in the matching process. In some embodiments, this is used to reflect cases where associations between input and results are of a probabilistic nature or in certain one-to-one associations.

In an alternative preferred embodiment, the special state information could be arranged to be "multiplicative" or "divisional" (or any other suitable mathematical process) in addition to, or rather than, being "additive" or "subtractive," in which case the default keyword numerical value would be multiplied or divided by the "special state" numerical values before being applied to the threshold test. A single match can occur, or multiple matches can occur at the same step (cycle) of the process, where multiple matches represent the occurrence of multiple simultaneous conditions. The process continues on FIG. 6B.

Referring to FIG. 6B, at 622, the rule processor module accesses the HVD selected pages and sends the results to a vulnerability accumulator module. At 624, the rule processor module updates the state information in the state accumulator module with HVD indices of pages just accessed. At 626, a determination is made as to whether more cycles are needed to satisfy the customer's input request. In a preferred embodiment, the determination is made by the rule processor module, which decides if more cycles are needed to obtain vulnerabilities for the element currently being considered, or whether the next element (or combination of elements) needs to be considered in turn. For a given combination, the rule processor module knowing that it has not yet reached the bottom HVD page makes the determination when the cycling has occurred down to the bottom of the HVD structure, in which case the selector information contains no further possible page look-ups for that element or combination of elements. If more cycles are needed, the cycle counter is incremented by one and the process continues at 606 with additional data from the policy-based descriptive input being utilized for each new cycle. If a new element is to be considered, the cumulative cycle counter is incremented by the value of the cycle counter, then the element counter is incremented, while the cycle counter is reset to 1. If a new combination is to be considered, the cumulative cycle counter is incremented by the value of the cycle counter, then the combination counter is incremented, while the cycle counter is reset to 1. Preferably, the state is accumulated as the cycles continue, and the process ends when no further elements or combinations must be considered, or when the user provides a "no further cycles" notification. If no more cycles are needed, at 628, the rule processor module updates the EDD with customer information. Customer information can include, but is not limited to, cycle counter and/or cumulative cycle counter values, element counter value, combination counter value, system/network "checked" status and date last checked for vulnerabilities, and problem resolution data. The process ends at 630.

Example of Obtaining a Response to User Input Utilizing HVD Structure

FIG. 7 is an illustrative example of a preferred embodiment of cycling through a hierarchical vulnerability database structure 700 of a system for electronic profile and policy vulnerability and reliability assessment. In an example, a user, such as a system administrator requests help examining a policy/profile-controlled network (e.g., encompassing a set of interconnected routers, etc.) for potential security vulnerabilities. In one preferred embodiment, the user utilizes the implementation shown in FIGS. 6A and 6B. Preferably, the HVD structure 700 has been pre-provisioned with the associated vulnerability information for the type of elements included in the network (i.e., the routers, and perhaps even the specific make and model of routers). In an example, the policy/profile information, which may be stored in the EDD 210 or provided as input by the user, preferably includes the set-up configuration and all operating options defined and activated on each router and router interface in the network, as well as certain network-wide configuration information possibly including network topology and any divisions into network "zones," etc.

Generally, a cycle begins at a top level of the HVD structure 700, with a user responding to the "start" prompt presented by the presentation module 204 at the user's processing device 102 by clicking on a "yes" icon, or other indication, which initiates the cyclical process for the initial router element under examination. Throughout the process of cycling through the HVD structure 700 more detailed information is accessed with each cycle, gradually traversing down through lower levels of the HVD structure 700 until that element has been completely examined. The next element (e.g., another router) is then examined in the same fashion. As the process proceeds, certain combinations of elements are flagged and added to the "state" information so that these combinations of routers will be examined together. The user monitors the process via intermediate results found, although the user does not need to continuously monitor the cycling process. At the completion of the process, all vulnerability results for the network and the routers comprising it (and necessary combinations of routers, etc.) are provided to the user for viewing or saving in a file.

The HVD pages shown in FIG. 7, and any keywords listed are merely illustrative examples. In a preferred embodiment, initialization begins with any state previously stored in the state accumulator module 306 being reset (i.e., erased). The user and network (or system) are identified, allowing the EDD 210 to be accessed to retrieve the pertinent records. User and/or system records can include known configuration information, for instance that some of the edge routers utilize the Border Gateway Protocol (BGP) routing method, services installed/used, such as telnet for user access, ftp for file transfer, and that are both available, level of vulnerability examination service purchased, etc. This information, or a subset of it, is preferably stored in the state accumulator module 306 for reference. The cycle counter and element counter are both reset to equal "1" which represents the first cycle for the first element.

In an example, the element initially being examined, i.e., the router, is a single element. Combinations of elements, such as combinations of routers, or router components such as various interface cards can also be examined, in later stages of the process, as is determined necessary by information obtained in earlier stages from the HVD 212 and stored in the state accumulator module 306. If desired during implementation, these combinations can be denoted using element counter numbers greater than the total number of elements in the examined system. For example, if there are 100 routers in the network, and 500 additional combinations of routers and/or router components that must be examined, then those combinations can be identified as element counter values 101 through 601 while the routers themselves are denoted using values 1 through 100. Alternately, a separate combination counter can be added to directly indicate the sequential number of the combination being considered (with value initially set to 1).

In an example, HVD page 702 is the top page of the HVD structure 700 with a page with Index=1 and is the "current" page. The current page is preferably arranged to list a number of high level conditions, which ultimately, by deeper access into the HDV structure 700, may lead to identified vulnerabilities. In an illustrative example, one of these conditions is "IP (Internet Protocol) Interfaces." The rule processor module 304 matches this condition with policy information for the router under examination since the policy information indicates several IP interfaces are present and active. Preferably, if any extraneous input is provided in the policy/profile input for that router, the input parser/filter module 308 removes the extraneous information from consideration. Associated with this matched condition is the keyword "IP_int_present_active." The rule processor module 304 looks in the selector section 708 of the current page 702 and sees that "IP_int_present_active Index 6, 8, 24" is present as one of the lines of selector information, indicating that pages 6, 8, and 24 should be accessed. The cycle counter is incremented to "2." Note that in this step, there is only one current page.

HVD pages 6, 8, and 24 (710, 712 and 714, respectively) are accessed. Data section portions of each page 710, 712 and 714 are provided to the vulnerability accumulator module 302. The vulnerability accumulator module 302 stores the information and provides the included prompt-related information and the informative text and graphics to the user via the presentation module 204. The user may choose to view the intermediate results, and can also respond to a prompt to "stop" or "re-start" the cycling process. Pages 6, 8, and 24 (710, 712 and 714) become the "current" pages. Upon reviewing the current pages 710, 712 and 714, the rule processor module 304 cannot find any matches between the policy/profile input for the current router on the information contained on pages 6 and 8 (710, 712), but one match occurs regarding page 24 (714), which indicates that the current router is an edge router. In other examples where multiple pages are reviewed, the rule processor module 304 may find pertinent information and/or prompts from all or some subset of the current pages. The associated keyword is "IP_edge." This keyword utilized by the rule processor module 304 is located in the selector section 720 of page 24 (714) on the same line as index 20366, such that it determines that page 20366 should be accessed to obtain information about particular vulnerabilities possible with IP edge routers. Indices 6, 8, and 24 are stored as "state" in the state accumulator module 306. The cycle counter is again incremented and now it equals "3".

HVD page 20366 (722) is accessed and its data section 723 portion of the page 722 is provided by the rule processor module 304 to the vulnerability accumulator module 304. In a preferred embodiment, the presentation module 204 provides the intermediate results including informative text and graphics to the user's processing device 102 for optional monitoring. The rule processor module 304 retains the matching field of the selector section 721, which needs to be tested for matching with the policy/profile input. One potential match addresses whether or not the IP interface exposes its IP address and utilizes packet filtering to ensure security, which in some embodiments is similar to the functionality of an electronic firewall. Another potential match addresses non-packet-filtered cases with exposed IP address, or other related cases such as the filtering functionality being present but being disabled. If such information is already in the configuration records retrieved from the EDD 210 during the first cycle and thus available in the state accumulator module 306, then some of these tests for matching may not need to be undertaken or may be undertaken to verify rather than obtain additional information. In this example, no packet filtering is active and the IP address is exposed. Therefore, the second case (i.e., IP address is exposed case) is matched by the rule processor module 304. This case has the keyword "IP_exposed_filtering_none," enabling the rule processor module 304 to find (on the same line in the selector section 721) index references to pages 1109237 and 1210077. Index 20366 is added to the state stored along with the previously stored information in the state accumulator module 306. The cycle counter is incremented to "4."

In this illustrative example, the rule processor module 304 only had to search the selector section 721 in one current page 722. Other examples may involve searching selector sections in more than one current page.

Pages 1109237 (724) and 1210077 (726) are accessed. Page 1109237 (724) contains information on potential vulnerabilities associated with a variant of IP technology called "MPLS" (Multiprotocol Label Switching). Page 1210077 (726) contains potential matches covering cases where the customer of the network provider connected at this edge router is either trusted (e.g., an affiliate or close partner of the network provider) or an unrelated customer (e.g., a regular customer which cannot be trusted as much as a close affiliate). In this example MPLS is used, and the customer is unrelated to the provider, leading to matches with the keywords "IP_mpls" (not shown) from page 724 and "Customer_untrusted" (not shown) from page 726. The rule processor module 304 accesses the indexes of the two pages 724, 726 and finds one line including "Index 45762979" and the other including "Index 45763016." Indices 1109237 and 1210077 are added to the state of the state accumulator module 306. The cycle counter is incremented to "5."

In this example, the rule processor module 304 searched selector sections in two current pages for keyword matches, and has found matches in both. In other examples, matches might be found in only one of a number of current pages. In other embodiments, a match might not be found at all, which would cause a default match to occur via the last line of each selector section, which would be a "return to higher level" entry. When this occurs, the rule processor module 304 is preferably provided with an Index such that the process returns to a point where the user is informed of the problem and prompted for optional additional input that subsequently would allow the process to continue. In still other examples, a "return to higher level" occurs repeatedly (because of repeated lack of matches) until the user returns to the top page, which by default preferably includes an "exit" option which causes the system to return to a start-up condition. In another preferred embodiment, every page may include an "exit" option as the second to last entry in the selector section, so that the user has an exit option at each page.

Pages 45762979 (728) and 45763016 (730) are accessed and their information is presented to the user. In an example, page 45762979 (728) provides indications that MPLS is vulnerable to exploitation when IP addresses are exposed on unprotected interfaces along with further explanatory information and suggestions regarding modifications to the policy/profile, which could alleviate the potential vulnerability. Pages 728 and 730 may include information that thanks the customer for using the service and prompts the customer to determine whether they wish to quit or re-start another search. In one preferred embodiment, the process continues automatically until final completion. Page 45763016 (730) provides indications that non-affiliated customers should not be provided with IP addresses of edge routers. Page 730 may also include information regarding several preferred alternatives, which can be incorporated into the policy/profile information. In this example, the user does not quit the cycling process and the cycle counter is incremented to "6."

In one embodiment, cycling continues for each subsequent element and element combination. Preferably, an element counter (not shown) is incremented for each subsequent element. The cycle counter is reset for each new element and then incremented for each new cycle involving that element. In a preferred embodiment, the potential vulnerability information is accumulated in the vulnerability accumulator module 302.

Preferably, the EDD 210 contains the number and type of elements (e.g., routers) of the particular policy/profile-controlled system under examination. For example, the policy/profile information may contain information needed to set-up, provision, configure, control, and manage the system and its components.

In a preferred embodiment, as the examination process is undertaken for the elements of the system, i.e. the routers, cases will be identified and stored in the state accumulator module 306 for combinations of elements (i.e., sets of routers and router components) to be examined together in order for certain potential vulnerabilities to be uncovered which depend on or relate to interactions between the items in a particular combination. For example conditions identified in an earlier cycle may cause combinations to be selected and retained by the rule processor module 304 for evaluation in a later cycle. By way of example, any subset of routers participating together in a particular routing protocol may be divided into combinations of nearest-neighbors so that their configurations can be tested to be consistent with that necessary to avoid security vulnerabilities. Another example of a combination includes routers using cryptographic authentication to identify each other's routing updates, in which case the configurations would be tested in combination to ensure that the authentication set-up matches properly and that no options are configured which would circumvent security.

At the completion of the cycles for elements and element combinations, the cycling process terminates and the resulting vulnerabilities are presented to the user. In a preferred embodiment, the system returns to a start-up state, in which it is ready to begin another cycle. Preferably, accumulated vulnerability results are saved to the EDD 210 for this user. In another preferred embodiment, information saved to the EDD 210 includes associated information of any sort, which may be helpful for record keeping, billing, or future inquiries, among others. In another preferred embodiment, this information may include the number of levels or pages accessed, the element counter value (or alternately the values of the element and combination counters) and the cumulative cycle count, which indicates the number of elements or element combinations examined and the amount of time transpired, among others.

In an alternative preferred embodiment where the user quits the system, the accumulated state could be erased from the state accumulator module 306 rather than left intact to be erased at the next initialization occurrence. If the user chose not to quit, the system returns to initialization step. The user's records remain available and thus do not have to be pulled from the EDD 210. In this example, pages 45762979 (728) and 45763016 (730) are both "bottom" pages, in that they include no selector section information other than the "return to higher level" and/or "quit" entries, i.e. they contain no other lines of keywords with associated index values (other than these last two default lines for "return" and "quit"). Thus pages 728, 730 include null selectors, and cannot be utilized to delve to any deeper level of the HVD structure 700 since no deeper level of the HVD structure 700 exists for this example inquiry.

In an alternative preferred embodiment, the information saved in the EDD 210 is saved at the conclusion of a previous step rather than at the inquiry conclusion. Interim saving of information is useful to, for example, improve operating efficiency, performance, or reliability when a user performs multiple back-to-back inquiries. In addition, interim saving of information is particularly helpful in the event of an unexpected malfunction or power loss.

It should be emphasized that the above-described embodiments of the present invention, particularly, any "preferred" embodiments, are merely possible examples of implementations, merely set forth for a clear understanding of the principles of the invention. Many variations and modifications may be made to the above-described embodiment(s) of the invention without departing substantially from the spirit and principles of the invention. All such modifications and variations are intended to be included herein within the scope of this disclosure and the present invention and protected by the following claims.

What is claimed is:

1. A system for providing vulnerability information regarding a system, comprising:
   a database populated with descriptive system information about the system;
   a database structure configured as a hierarchical plurality of database pages, at least a portion of the hierarchical plurality of database pages including a page index, a data section and a selector section, wherein the data section is configured to include information regarding vulnerability of an element of the system and the selector section is configured to include keywords associated with at least one page index of a further, related database page of the hierarchical plurality of database pages;
   a rule processor module configured to provide rules for cycling through the hierarchical plurality of database pages of the database structure to obtain a database page of the hierarchical plurality of database pages having at least one keyword that matches keywords provided by user input, wherein the at least one page index associated with the at least one keyword of the obtained database page is associated with a further, related database page to be obtained while cycling through the hierarchical plurality of database pages;
   an input parser/filter module operatively coupled to the rule processor module, the input parser/filter module configured to receive policy or profile input from a user's processing device and to convert the input into data usable by the rule processor module, wherein the data usable by the rule processor comprises at least the keywords provided by the user input;

a state accumulator module operatively coupled to the rule processor module, the state accumulator module configured to store intermediate vulnerability status and result information; and a vulnerability accumulator module operatively coupled to the rule processor module, the vulnerability accumulator module configured to store the information regarding vulnerability of an element of the system accumulated from the data section of each of the hierarchical plurality of database pages accessed while cycling through the hierarchical plurality of database pages.

2. The system of claim 1, further comprising a presentation module operatively coupled to a user's processing device and the vulnerability accumulator module, the presentation module configured to summarize and format the information regarding vulnerability of an element of the system accumulated from the data section of each of the hierarchical plurality of database pages accessed while cycling through the hierarchical plurality of database pages for utilization by the user's processing device.

3. The system of claim 1, further comprising a database interface module operatively coupled between the database and database structure, and the result accumulator module, the database interface module configured to enable provisioning and access to the database and the database structure.

4. The system of claim 1, wherein the database comprises an element descriptive database (EDD).

5. The system of claim 1, wherein the database structure comprises a hierarchical vulnerability database (HVD) structure.

* * * * *

UNITED STATES PATENT AND TRADEMARK OFFICE
CERTIFICATE OF CORRECTION

PATENT NO. : 7,735,142 B2
APPLICATION NO. : 11/768055
DATED : June 8, 2010
INVENTOR(S) : Jeffrey A. Aaron It is certified that error appears in the above-identified patent and that said Letters Patent is hereby corrected as shown below:

Col. 16-17, lines 40-13;
The correct Claim 1 should read:

1. A system for providing vulnerability information regarding a system, comprising:

a database populated with descriptive ~~system~~ information about the system;
a database structure configured as a hierarchical plurality of database pages, at least a portion of the hierarchical plurality of database pages including a page index, a data section and a selector section, wherein the data section is configured to include information regarding vulnerability of an element of the system and the selector section is configured to include keywords associated with at least one page index of a further, related database page of the hierarchical plurality of database pages;
a rule processor module configured to provide rules for cycling through the hierarchical plurality of database pages of the database structure to obtain a database page of the hierarchical plurality of database pages having at least one keyword that matches keywords provided by user input, wherein the at least one page index associated with the at least one keyword of the obtained database page is associated with a further, related database page to be obtained while cycling through the hierarchical plurality of database pages;
an input/parser/filter module operatively coupled to the rule processor module, the input parser/filter module configured to receive policy or profile input from a user's processing device and to convert the input into data usable by the rule processor module, wherein the data usable by the rule processor comprises at least the keywords provided by the user input;
a state accumulator module operatively coupled to the rule processor module, the state accumulator module configured to store intermediate vulnerability status and result information; and
a vulnerability accumulator module operatively coupled to the rule processor module, the vulnerability accumulator module configured to store the information regarding vulnerability of an element of the system accumulated from the data section of each of the hierarchical plurality of database pages accessed while cycling through the hierarchical plurality of database pages.

Signed and Sealed this
Twenty-second Day of March, 2011

David J. Kappos
*Director of the United States Patent and Trademark Office*